United States Patent
Keiser et al.

(10) Patent No.: US 10,116,458 B2
(45) Date of Patent: *Oct. 30, 2018

(54) FAMILY COMMUNICATIONS IN A CONTROLLED-ENVIRONMENT FACILITY

(71) Applicant: Securus Technologies, Inc., Carrollton, TX (US)

(72) Inventors: Luke Keiser, Frisco, TX (US); Ted Hull, Fredericksburg, VA (US); Matthew Richard Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,995

(22) Filed: May 30, 2017

(65) Prior Publication Data

US 2017/0264448 A1 Sep. 14, 2017

Related U.S. Application Data

(63) Continuation of application No. 13/898,324, filed on May 20, 2013, now Pat. No. 9,667,763.

(51) Int. Cl.
*H04N 7/15* (2006.01)
*H04L 12/18* (2006.01)
*G10L 15/18* (2013.01)
*G06Q 50/26* (2012.01)

(52) U.S. Cl.
CPC ....... *H04L 12/1822* (2013.01); *G06Q 50/265* (2013.01); *G10L 15/1815* (2013.01); *H04N 7/152* (2013.01)

(58) Field of Classification Search
CPC combination set(s) only.
See application file for complete search history.

(56) References Cited

U.S. PATENT DOCUMENTS

| | | |
|---|---|---|
| 9,399,111 B1 | 6/2016 | Hanina |
| 9,667,763 B1 | 5/2017 | Keiser et al. |
| 2005/0114192 A1 | 3/2005 | Tor et al. |
| 2005/0084086 A1 | 4/2005 | Hesse |
| 2006/0087554 A1 | 4/2006 | Boyd et al. |
| 2008/0201158 A1 | 8/2008 | Johnson et al. |
| 2008/0259155 A1* | 10/2008 | McLelland ............ H04N 7/147 348/14.03 |
| 2009/0067604 A1 | 3/2009 | Apple et al. |
| 2009/0150252 A1 | 6/2009 | Schoenberg |
| 2011/0096139 A1 | 4/2011 | Rudolf |
| 2012/0204029 A1 | 8/2012 | Trabucco |
| 2012/0281058 A1* | 11/2012 | Laney .................... H04N 7/147 348/14.03 |
| 2012/0320145 A1 | 12/2012 | Kahn |
| 2013/0067521 A1 | 3/2013 | Markel et al. |

(Continued)

*Primary Examiner* — Joseph J Nguyen
(74) *Attorney, Agent, or Firm* — Fogarty LLP

(57) ABSTRACT

Systems and methods for facilitating family communications in a controlled-environment facility. In some embodiments, a method may include receiving a request for an electronic communication between a resident and a non-resident of a controlled-environment facility, identifying that the non-resident is the resident's child or parent and, in response to the identification, enabling a family counseling provider to access the electronic communication.

20 Claims, 5 Drawing Sheets

(56) References Cited

U.S. PATENT DOCUMENTS

2013/0238713 A1\* 9/2013 Abuelsaad .......... H04L 12/1818
709/206
2014/0156292 A1 6/2014 Kozicki et al.

\* cited by examiner

FAMILY COMMUNICATIONS IN A CONTROLLED-ENVIRONMENT FACILITY

CROSS-REFERENCE TO RELATED APPLICATION

This is a continuation of, and claims benefit of, U.S. patent application Ser. No. 13/898,324, also entitled Family Communications in a Controlled-Environment Facility, filed May 20, 2013, which issued on May 30, 2017, as U.S. Pat. No. 9,667,763, and which is hereby incorporated herein by reference.

TECHNICAL FIELD

This specification relates to systems and methods for facilitating family communications in a controlled-environment facility.

BACKGROUND

In the United States, prison inmates have certain visitation rights. By allowing prisoners to have some contact with the outside world while incarcerated, the justice system aims to facilitate their transition back into society upon release. Traditional forms of contact include telephone calls, in-person visitation, etc. More recently, technological advances have allowed jails and prisons to provide other types of visitation, including videoconferences and electronic chat sessions.

Despite these various visitation opportunities, the inventors hereof have determined that incarcerated parents are less likely to communicate with their children and vice-versa. As a consequence, children of incarcerated parents have a greater likelihood of later becoming incarcerated themselves. Also, incarcerated parents who do not communicate with family members frequently, especially with their own children, have higher recidivism rates.

SUMMARY

Embodiments disclosed herein are directed to systems and methods for facilitating family communications in a controlled-environment facility. In an illustrative, non-limiting embodiment, a method may include receiving a request for an electronic communication between a resident and a non-resident of a controlled-environment facility, identifying that the non-resident is the resident's child or parent, and, in response to the identification, enabling a family counseling provider to access the electronic communication. For example, the controlled-environment facility may be a jail or prison, and wherein the resident is an inmate. Also, the electronic communication may be selected from the group consisting of: a telephone call, a video visitation session, an electronic chat session, and an email.

In some implementations, enabling the family counseling provider to access the electronic communication may include recording the electronic communication, flagging the recording as a parent-child communication, and providing the recording to the family counseling provider. Enabling the family counseling provider to access the electronic communication may include at least one of: recording the electronic communication or allowing the family counseling provider to participate in the electronic communication in real-time. Moreover, allowing the family counseling provider to participate in the electronic communication in real-time may include preventing the child from seeing or hearing the family counseling provider's participation.

In some embodiments, the method may include, prior to enabling the family counseling provider to access the electronic communication, facilitating a counseling session between the resident and the family counseling provider, and, in response to successful completion of the counseling session, facilitating the electronic communication between the resident and the non-resident. The method may also include, after completion of the electronic communication, facilitating a follow-up counseling session between the resident and the family counseling provider, the follow-up counseling session addressing one or more issues raised during the electronic communication.

For instance, facilitating the follow-up counseling session may include charging an account associated with the resident at a smaller than normal rate. Additionally or alternatively, facilitating the follow-up counseling session may include facilitating the follow-up counseling session without charging an account associated with the resident, the account otherwise configured to fund the resident's electronic communications.

The method may further include, after completion of the follow-up counseling session between the resident and the family counseling provider, providing an incentive to the resident. For example, the incentive may be selected from the group consisting of: electronic content, commissary item, increased number or amount of visitation, increased number or amount of electronic communications, increased leisure time, increased pay, and credit for good behavior.

In another illustrative, non-limiting embodiment, another method may include receiving an indication that a request for an electronic communication between a resident and a non-resident of a correctional facility has been made, where the non-resident is the resident's child, and access the electronic communication. For example, the method may include obtaining a recording of the electronic communication. Additionally or alternatively, the method may include enabling a counselor to participate in the electronic communication in real-time.

In some implementations, the method may include enabling a counselor to initiate a counseling session with the resident prior to the electronic communication. The method may also include enabling a counselor to initiate, after the electronic communication, a follow-up counseling session addressing one or more issues raised during the electronic communication.

In yet another illustrative, non-limiting embodiment, yet another method may include receiving a request for a video visitation between a resident and a non-resident of a correctional facility, and, in response to determining that the non-resident is the resident's child, enabling a family counseling provider to access the video visitation in response to a determination that the non-resident is the resident's child. The method may also include obtaining a recording of the electronic communication and/or to participating in the electronic communication in real-time. The method may further include initiating a counseling session between with the resident prior to the electronic communication and/or initiating, after the electronic communication, a follow-up counseling session addressing one or more issues raised during the electronic communication.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for facilitating family communications in a controlled-environment facility. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, and/or inmates. It should be understood, however, that the systems and methods described herein may be similarly applicable to other types of controlled-environment facilities and their respective residents (e.g., a hospital and its patients).

Figure 1:
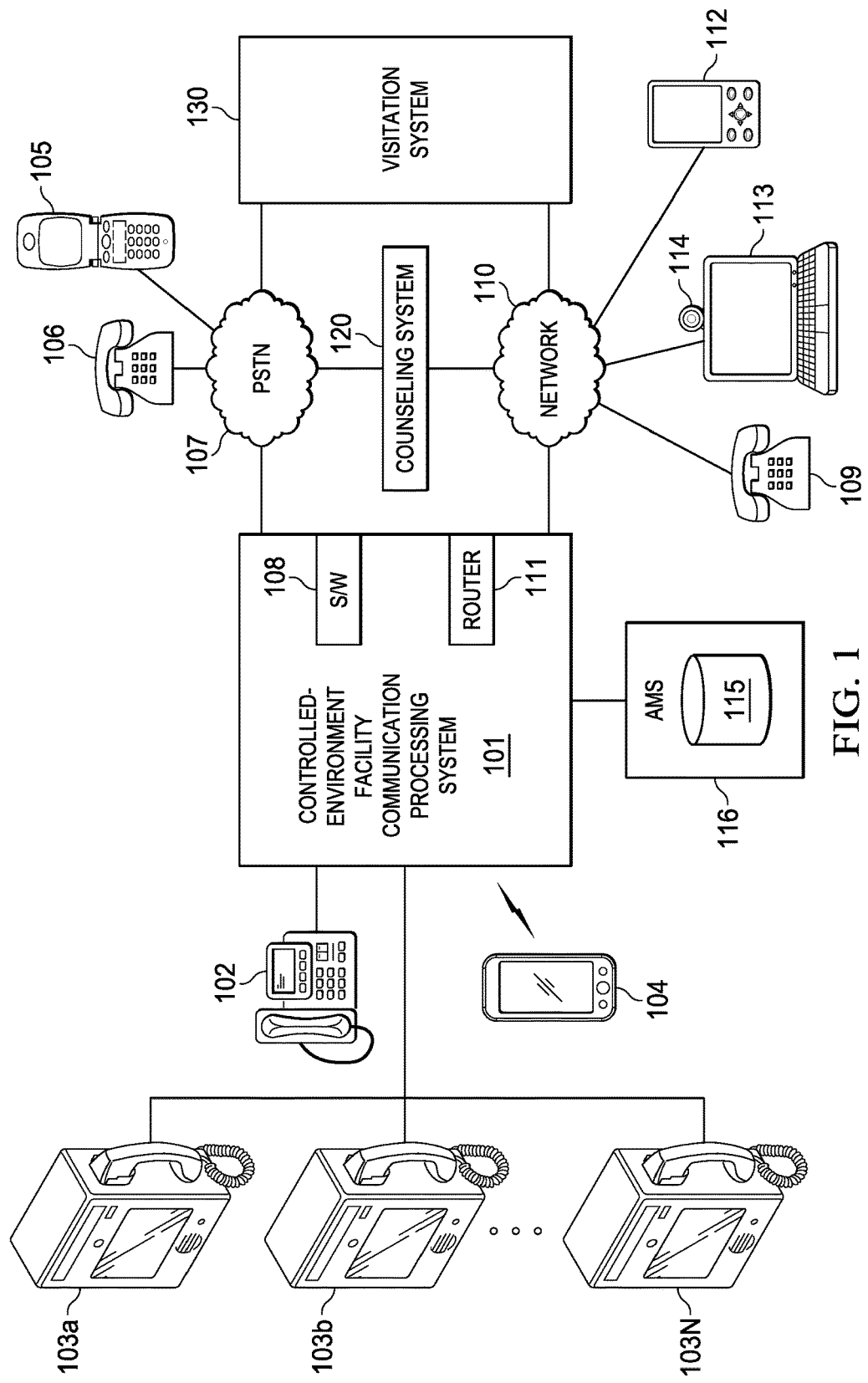
FIG. 1 is a block diagram of an example of an environment where a system for facilitating family communications may be employed according to some embodiments.

Turning now to FIG. 1, a block diagram of an illustrative environment where a system for facilitating family communications may be employed is depicted according to some embodiments. As shown, communication processing system 101 may provide telephone services, videoconferencing, online chat, email, and other communication services to a controlled-environment facility (e.g., a correctional facility). For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some cases, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103a-n (each collectively referred to as "video visitation device 103") may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116. In some embodiments, a PAC list may identify each person approved to communicate with a given inmate, as well as a relationship between that person and the inmate (e.g., friend, attorney, spouse, child, parent, cousin, uncle, aunt, etc.). In addition to PAC list(s), AMS 116 may also store inmate or Resident Profile Data or RDP (e.g., full name, date and place of birth, residence(s), etc.), as well as any visitation rules applicable to each inmate.

As an example, still in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates. Database 115 may also include other personal information about each inmate.

Generally speaking, database 115 may include any suitable type of application or data structure that may be configured as a data repository. For example, database 115 may be configured as one or more relational databases that include one or more tables of columns and rows and that may be searched or queried according to a query language, such SQL or the like. Alternatively, database 115 may be configured as structured data stores that include records formatted according to a markup language, such as XML, or the like. In other embodiments, database 115 may be implemented using one or more arbitrarily or minimally structured files managed and accessible through a corresponding type of application.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, video visitation devices 103 may be implemented as computer-based systems. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In some cases, video visitation devices 103 may assume the form of any computer, tablet computer, smart phone, etc., or any other consumer device or appliance with videoconferencing capabilities.

Similarly, as described above, counseling system 120 may be configured to provide, schedule, and manage counseling services to residents and non-residents of a controlled-environment facility. To that end, counseling system 120 may be coupled to PSTN 107 and/or network 110 by also including one or more gateways, switches and/or routers (not shown). Accordingly, counseling system 120 may be configured to communicate with one or more residents of the controlled-environment facility via devices 102-104, and with one or more non-residents via devices 105, 106, 109, 112, and/or 113. In some cases, a counselor or therapist may communicate with a resident and/or a non-resident via any of devices 102-106, 109, 112, and/or 113. Although counseling system 120 is shown in FIG. 1 as being remotely located with respect to communication processing system 101 and the controlled-environment facility, in other cases counseling system 120 may be co-located with the facility and/or integrated within system 101 and/or visitation system 130.

In some embodiments, counseling system 120 may be operated by a counseling entity or organization part of or distinct from the controlled-environment facility. For example, a parenting education, classes, therapy, coaching, and/or psychological services provider may provide individual or group counseling services to residents and non-residents of the controlled-environment facility. These counseling services may be wide-ranging, and may be designed to help an inmate cope with his or her incarceration, deal with traumatic experiences in and out of the facility, manage his or her expected release from the facility, etc. Such services may also help facility personnel, non-residents of the facility (e.g., who might have some relationship with an incarcerated resident), and many others.

In some implementations, a counseling entity may include a program designed specifically for assisting incarcerated parents in communicating with their non-incarcerated children. Such programs may include lecture or instructional portions (e.g., effective communication skills, emotional issues, remote parenting, etc.), as well as a one-on-one coaching portions that address situations particular to a given parent and/or child. In some cases, a parent-child counseling program may begin when a parent is incarcerated, and it may continue after the parent's release from the facility.

The inventors hereof have determined that, absent some form of counseling, children of incarcerated parents have a greater likelihood of becoming incarcerated themselves. Also, incarcerated parents who do not communicate with family members frequently, especially with their own children, have higher recidivism rates. Because incarcerated parents are naturally less likely to communicate with their children and vice-versa, various techniques described herein are designed to facilitate or encourage those communications by employing counseling system 120 in conjunction with visitation system 130 and/or communication system 101. Examples of these techniques are described in detail below with respect to FIGS. 5 and 6.

Similarly, the inventors hereof have also determined that when children are incarcerated (e.g., a juvenile inmate), communication with parents can improve their chances of succeeding and adapting to life outside of prison upon re-entry. While certain ones of the systems and methods described herein may refer to communications initiated by an incarcerated parent and directed towards a non-resident child, it should be understood that the same systems and methods are also suitable to accommodate communications initiated by children inmates and directed toward their non-resident parents.

Figure 2:
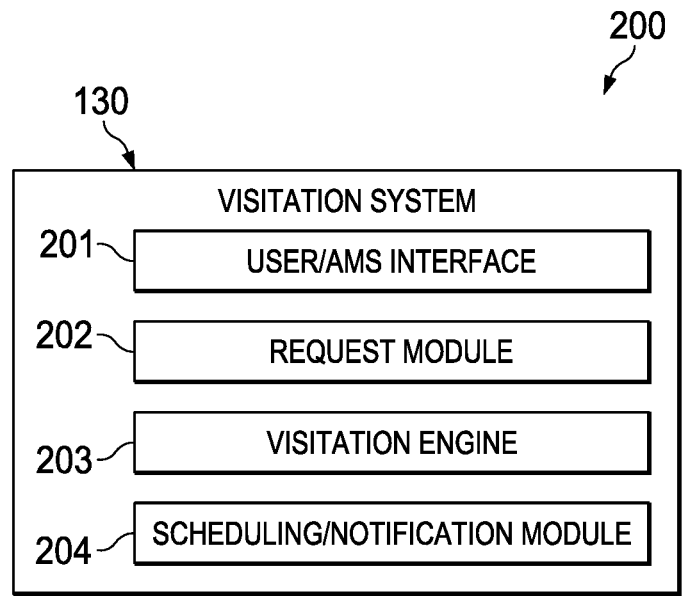
FIG. 2 is a block diagram of an example of a video visitation system according to some embodiments.

Referring to FIG. 2, a block diagram of visitation system 130 for providing visitation services to residents and non-residents of a controlled-environment facility is depicted according to some embodiments. As shown, visitation system 130 includes user and/or AMS interface 201. In some embodiments, residents and/or non-residents of one or more controlled-environment facilities may access, interact with, or otherwise use visitation system 130 via interface 201. For example, interface 201 may be provided as a web interface, IVR interface, or the like. Visitation system 130 may also interact with one or more AMS systems 116 either directly or via a computer network such as the Internet 110 using interface 201.

In some scenarios, a resident and/or non-resident may connect to visitation system 130 via interface 201. For example, the resident and/or non-resident may directly or indirectly (e.g., through an officer or personnel of the controlled-environment facility) reach a computer terminal or a telephone disposed within a controlled-environment facility and request visitation services. In other scenarios, the resident and/or non-resident may interact with interface 201 via PSTN 107 using an IVR system or the like. Additionally or alternatively, the resident and/or non-resident may access interface 201 via a website, webpage, Internet portal, etc. via a computer network or Internet 110, for example, using a personal computing device (e.g., running a web browser), cell phone (e.g., via an "app"), prison terminal, or any other suitable client device.

When implemented to support web-based interactions, interface 201 may be deployed using a number of suitable techniques. For example, interface 201 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information. Further, in some implementations, a request and response data may be exchanged between a client and visitation system 130 through the use of messages or documents formatted in eXtensible Markup Language (XML) or other platform-independent data format. For example, in some embodiments, a web services request to provide visitation services may be embodied in an XML document including fields identifying the person(s) that will be participating in the visitation, the type, time, and/or duration of the visitation, and possibly other fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

In addition to interface 201, visitation system 130 includes visitation request module 202, visitation engine 203, and visitation scheduling/notification module 270. Visitation request module 202 may be configured to receive one or more visitation scheduling requests, modification requests, or cancellation requests, for example, via interface 201.

Visitation engine 203 may be configured to execute an incoming request, for example, by facilitating a voice, video, and/or electronic connection to take place between one or more residents and one or more non-residents. In some implementations, visitation engine 203 may be configured to identify that the resident and non-resident requesting to have an electronic communication are a parent and his child, for example, by consulting AMS 116 via interface 201. In some cases, visitation engine 203 may be configured to record and store a parent-child communication and flag in a recording database. Additionally or alternatively, visitation engine 203 may facilitate the participation of a counselor in the parent-child communication in real-time.

Visitation scheduling/notification module 204 may be configured to schedule a new visitation and/or notify a relevant party (e.g., resident, non-resident, counselor, etc.) of the new visitation. Scheduling/notification module 204 may also be configured to modify a previously scheduled visitation and/or notify a relevant party of the modification, or cancel a previously scheduled visitation and/or notify a relevant party of the canceled visitation.

In some embodiments, visitation engine 203 may be configured to store a plurality of rules usable by request module 202 and/or scheduling/notification module 204 during the course of their respective operations. For example, visitation engine 203 may store one or more scheduling rules that allows (or prohibits) certain persons to perform a visitation scheduling operation. Those rules may be applied to incoming visitation requests by visitation request module 202. Also, engine 203 may include other rules regarding notifications or conflict resolution operations that may be employed by scheduling/notification module 204.

Figure 3:
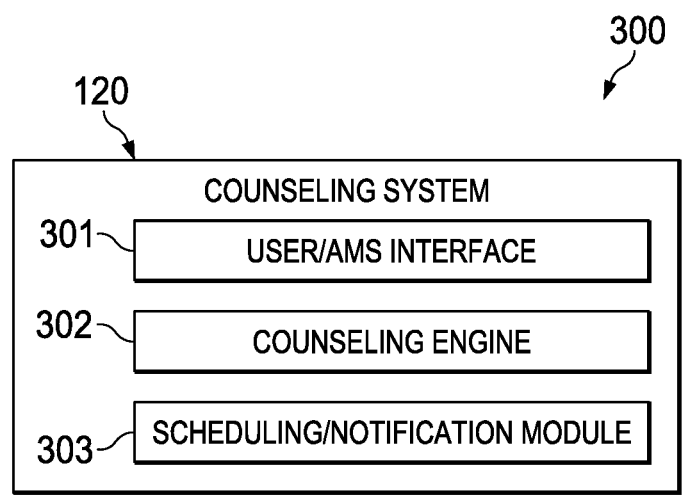
FIG. 3 is a block diagram of an example of a counseling system according to some embodiments.

FIG. 3 shows a block diagram of counseling system 120 for providing visitation services to residents and non-residents of a controlled-environment facility according to some embodiments. As shown, counseling system 120 includes user and/or AMS interface 301. In some embodiments, interface 301 may be similar to interface 201 of visitation system 130 in that residents and/or non-residents of one or more controlled-environment facilities may access, interact with, or otherwise use counseling system 120 via interface 301. For example, interface 301 may be provided as a web interface, IVR interface, or the like. Counseling system 120 may also interact with AMS system 116 either directly or via a computer network such as the Internet 110 using interface 300.

In addition to interface 301, counseling system 120 includes counseling engine 302 and counseling scheduling/notification module 303. Counseling engine 203 may be configured to access an electronic communication between a resident and a non-resident of the facility. For example, counseling engine 302 may retrieve a recorded communication between a parent and a child, as flagged by visitation system 130. Additionally or alternatively, counseling engine 302 may enable a counselor or therapist to intervene or otherwise participate, at least in part, in an ongoing communication between an incarcerated parent and a child.

In some cases, counseling engine 302 may be configured to electronically identify keywords spoken during a recorded video visitation or telephone call, how much (e.g., percentage) of the conversation was conducted by each party, whether screaming, crying or other unusual behavior was present during the communication, etc. In the case of written communications such as email and chat, counseling engine 302 may be configured to electronically identify typed words, sentences, or patterns. As such, counseling engine 302 may be configured to determine whether to suggest or require counseling of the resident and/or non-resident in response to having electronically analyzed the content of a communication and detected abnormalities. Additionally or alternatively, counseling engine 302 may enable a human counselor to manually review a communication and manually assign a score reflecting the perceived need for counseling.

In other cases, counseling engine 302 may be configured to enable a live counselor to interface with a resident during progress of an electronic communication. For example, as an ongoing video visitation session between a resident and a non-resident is being supported by visitation system 130, counseling engine 302 may enable a counselor to interface with the resident and/or the non-resident during that session. In some situations, only the resident (to the exclusion of the non-resident) or the non-resident (to the exclusion of the resident) may be able to see or hear the counselor or therapist; thus effectively preventing the other party from realizing that help is being provided.

In some implementations, counseling engine 302 may be configured to implement a long-term, parent-child counseling program. For instance, counseling engine 302 may include recorded lectures, classes, or instructional portions on a variety of parent-child topics. Counseling engine 302 may also include rules that implement a counseling program, for example, by causing counseling sessions to be suggested or required prior to (or after) a given parent-child communication, by allowing an incarcerated parent to participate in an incentive program that rewards him or her in response to positive outcomes, etc.

Counseling scheduling/notification module 303 may be configured to schedule a new counseling session and/or notify a relevant party of the new session, modify a previously scheduled counseling session and/or notify a relevant party of the modification, or cancel a previously scheduled counseling session and/or notify a relevant party of the canceled session.

Figure 5:
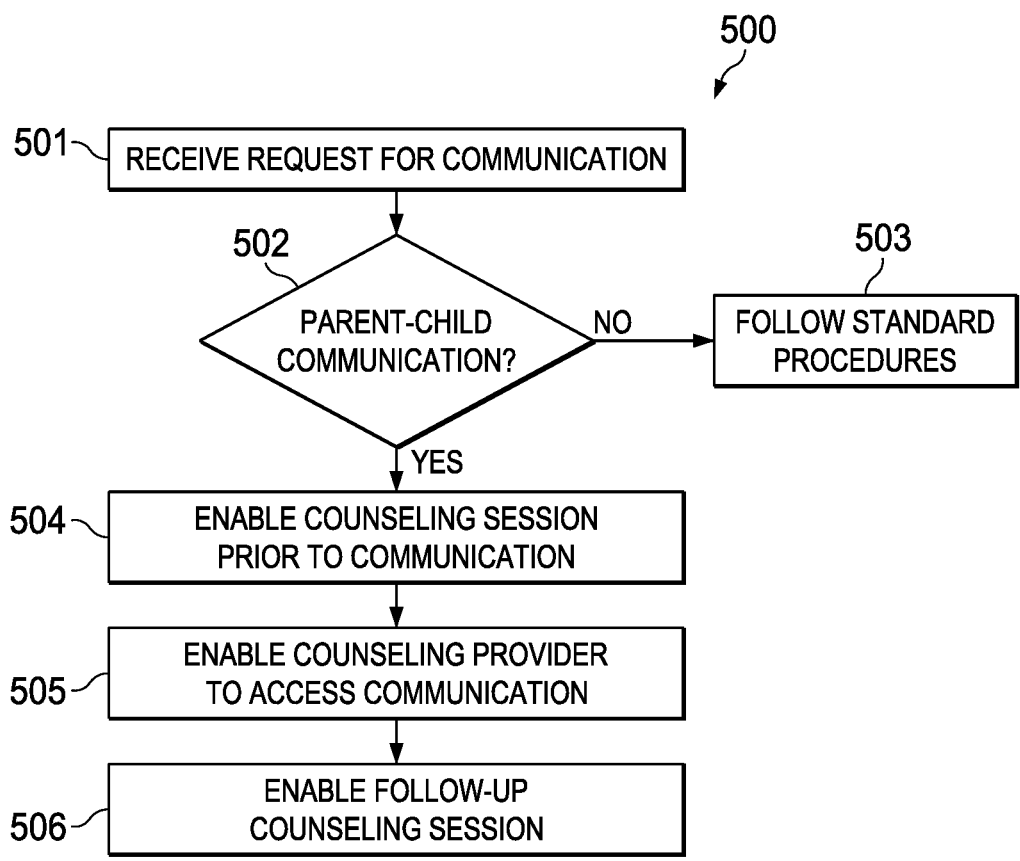
FIG. 5 is a flowchart of an example of a method for facilitating family communications according to some embodiments.
Figure 6:
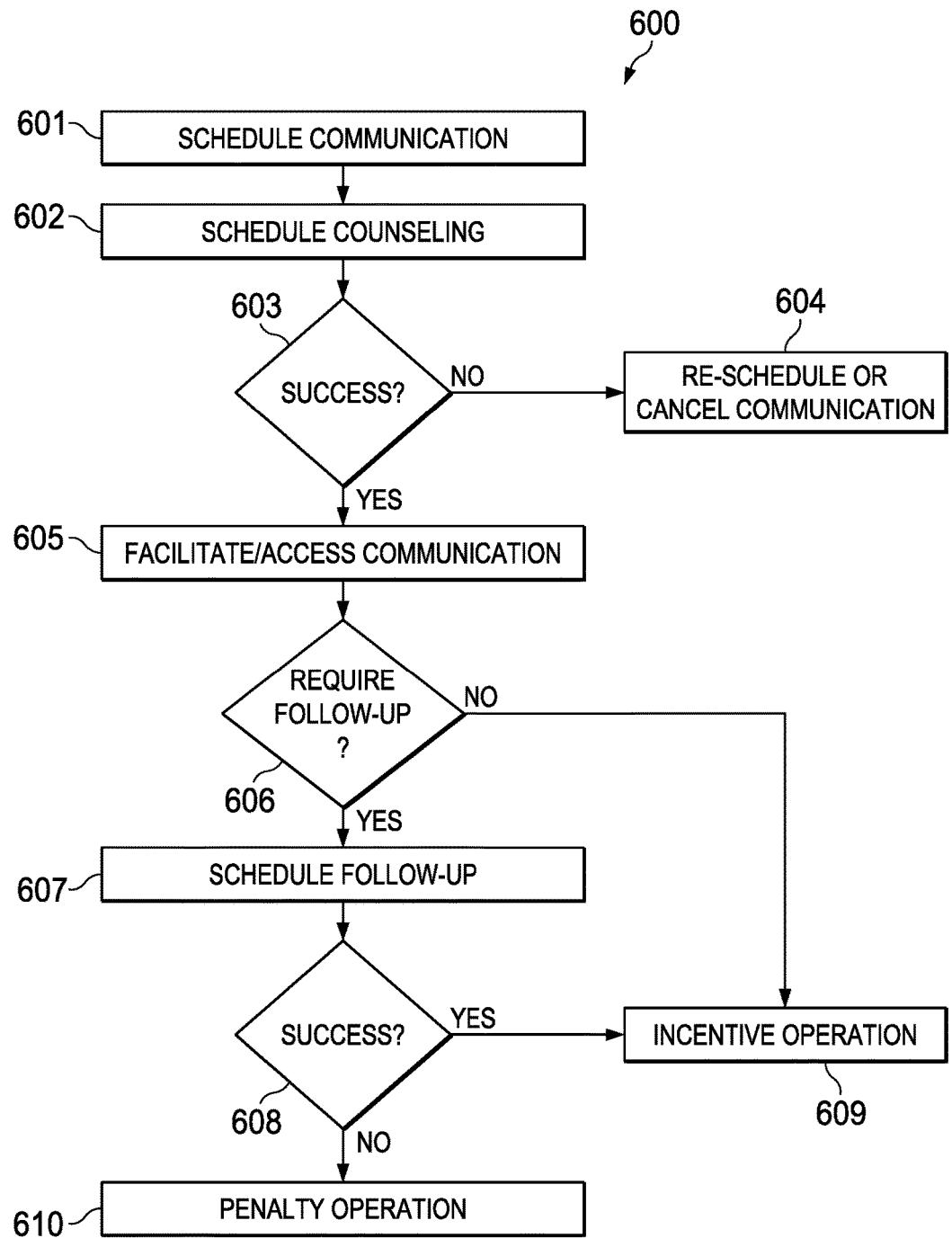
FIG. 6 is a flowchart of an example of a method for performing family communications and counseling activities following a curriculum or program according to some embodiments.

In various embodiments, modules 201-204 shown in FIG. 2 and blocks 301-303 shown in FIG. 3 may represent sets of software routines, logic functions, and/or data structures that are configured to perform operations described herein and particularly with respect to FIGS. 5 and 6. Although these modules are shown as distinct logical blocks, in other embodiments at least some of the functionality provided by these modules may be combined into fewer blocks. Conversely, one or more of modules 201-204 and/or 301-303 may be implemented such that it is divided among two or more logical blocks. Moreover, although shown with a particular configuration, in other embodiments these various modules may be rearranged in other ways.

Also, in certain embodiments, each of the different components of visitation system 130 and/or counseling system 120 may be implemented in software, hardware or a suitable combination thereof, in an integrated fashion (e.g., on a single server or computer system) or in a distributed fashion (e.g., via a number of discrete systems configured to communicate with one another via a network). Additionally or alternatively, the operation of visitation system 130 and/or counseling system 120 may be partitioned into components in a different fashion than illustrated in FIGS. 2 and 3.

Figure 4:
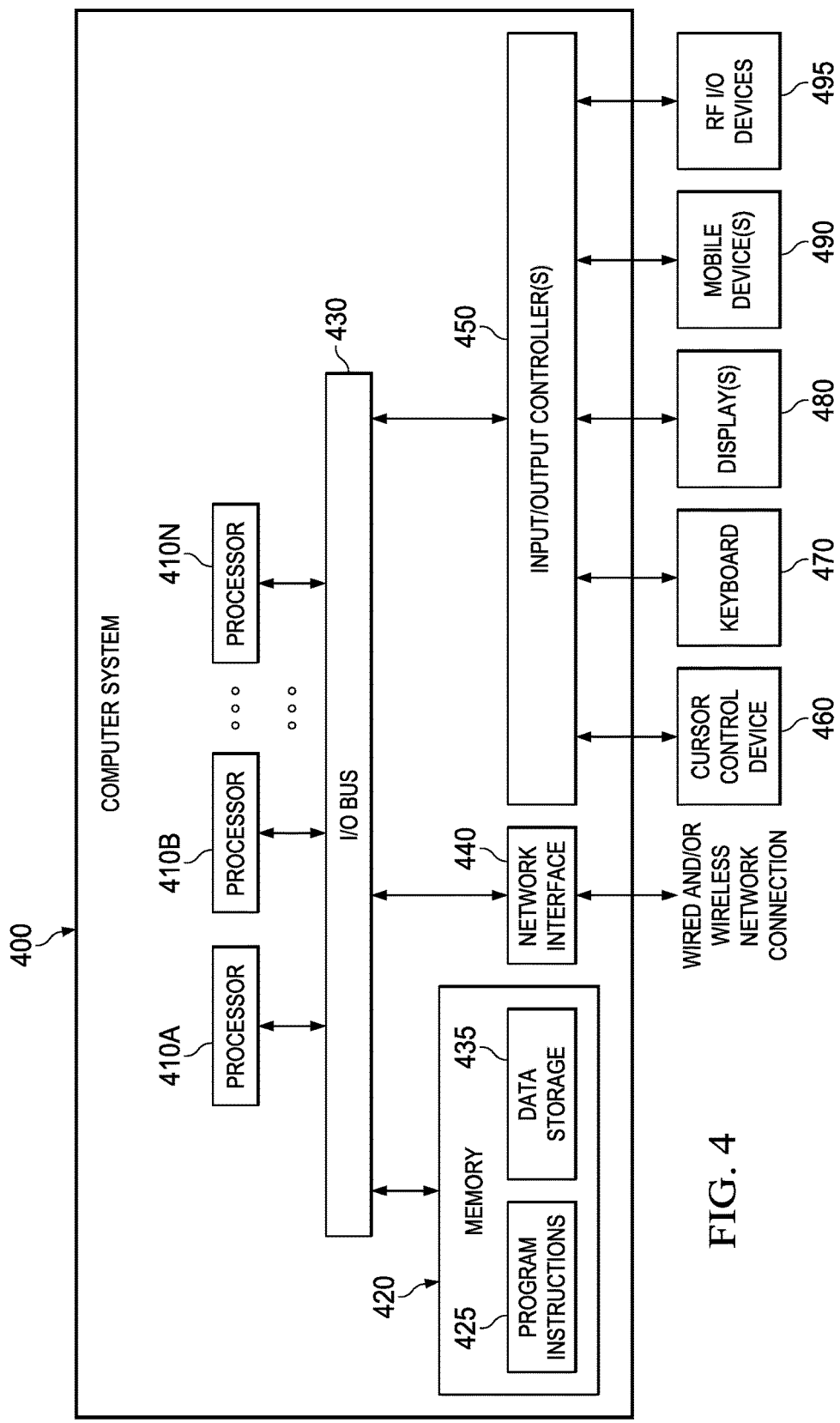
FIG. 4 is a block diagram of an example of a computer system configured to implement various systems and methods described herein according to some embodiments.

As noted above, embodiments of systems and methods for facilitating family communications in a controlled-environment facility may be implemented or executed, at least in part, by one or more computer systems. One such system is illustrated in FIG. 4. In various embodiments, system 400 may be a server, a workstation, a desktop computer, a laptop, a tablet computer, a mobile device, a smart phone, or the like. In some cases, system 400 may be used to implement counseling system 120 and/or video visitation system 130.

As illustrated, computer system 400 includes one or more processors 410A-N coupled to a system memory 420 via an input/output (I/O) bus 430. Computer system 400 further includes a network interface 440 coupled to I/O bus 430, and one or more I/O controllers 450 adapted to communicates with I/O devices such as cursor control device 460, keyboard 470, display(s) 480, mobile device(s) 490, and/or Radio Frequency (RF) I/O devices 495. Each I/O controller 450 may include, for example, a wired connection (e.g., serial port, Universal Serial Bus port) or wireless connection (e.g., Wi-Fi, Bluetooth, Near Field Communications Link, etc.) Other I/O devices may include, for example, surveillance cameras, microphones, antennas/wireless transducers, phone detection modules, etc. In some embodiments, each of counseling system 120, visitation system 130, AMS 116, communication processing system 101, devices 102-104, and/or devices 105, 106, 109, 112, and 113 may be implemented using a single instance of computer system 400, while in other embodiments multiple such systems, or multiple nodes making up computer system 400, may be configured to host different portions of a given electronic device or system.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 5 and 6, may be stored within system memory 420 as program instructions 425 and data storage 435, respectively. In other embodiments, program instructions and/or data may be received, sent or stored upon different types of computer-accessible media or on similar media separate from system memory 420 or computer system 400.

Generally speaking, a computer-accessible medium may include any tangible or non-transitory storage media or memory media such as electronic, magnetic, or optical media—e.g., disk or CD/DVD-ROM coupled to computer system 400 via I/O bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O bus 430 may be configured to coordinate I/O traffic between processor 410, system memory 420, and any peripheral devices in the device, including network interface 440 or other peripheral interfaces, such as I/O controllers 450. In some embodiments, I/O bus 430 may perform any necessary protocol, timing or other data transformations to convert data signals from one component (e.g., system memory 420) into a format suitable for use by another component (e.g., processor 410). In some embodiments, I/O bus 430 may include support for devices attached through various types of peripheral buses, such as a variant of the Peripheral Component Interconnect (PCI) bus standard or the Universal Serial Bus (USB) standard, for example. In some embodiments, the function of I/O bus 430 may be split into two or more separate components, such as a north bridge and a south bridge, for example. In addition, in some embodiments some or all of the functionality of I/O bus 430, such as an interface to system memory 420, may be incorporated directly into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices in communication with I/O controller 450 may, in some embodiments, include one or more display terminals, keyboards, keypads, touchpads, scanning devices, voice or optical recognition devices, mobile devices, or any other devices suitable for entering or retrieving data by one or more computer system 400. Multiple I/O devices may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements of embodiments illustrated in the above figures. For example, program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Turning now to FIG. 5, a flowchart of method 500 for facilitating family communications is depicted. In some embodiments, operations of method 500 may be performed, at least in part, by communication system 101, counseling system 102, and/or visitation system 130 of FIG. 1. As shown, at block 501, method 500 includes receiving a request for an electronic communication. For example, visitation system 130 may receive a request from a resident or from a non-resident of a controlled-environment facility to communicate with each other via telephone, video conference, live chat, etc.

At block 502, method 500 includes determining whether the resident and the non-resident have a parent-child relationship. For example, visitation system 130 may query AMS 116 to determine whether the non-resident is the resident's son or daughter. Additionally or alternatively, the request may indicate the relationship between the parties. Additionally or alternatively, visitation system 130 may place an automated communication to at least one of the parties asking for relationship information.

If the non-resident is other than the resident's child, then at block 503 the request may be subject to standard visitation procedures; which may be different than the special procedures detailed herein. If the non-resident is the resident's child, then, at block 504, method 500 may include enabling or facilitating a counseling session to take place prior to the communication between the resident and the non-resident.

For instance, visitation system 130 may indicate to counseling system 120 that an electronic communication has been requested between a parent and a child, and counseling system 120 may initiate or schedule a counseling session with the resident or non-resident. At the time of the scheduled counseling session, counseling system 120 may enable a human counselor to communicate with the resident and/or non-resident, or an automated presentation may be made to the resident and/or non-resident; the contents of the counseling session following a specified counseling curriculum or program designed to improve the relationship between an incarcerated parent and his children.

An example of a suitable curriculum or program is provided by Parenting with Love and Limits®, which include recognized evidence-based treatment models that combine parenting management groups and family therapy to quickly engage resistant parents. In other implementations, however, other programs may be used.

At block 505, method 500 includes enabling or facilitating the scheduled communication between the resident and the non-resident to take place (e.g., a telephone call, video visitation, online chat, etc.) and enabling or facilitating a counseling provider to access the communication. For example, visitation system 130 may record text, audio and/or video of the communication, and may flag that recording as a parent-child communication for later retrieval, review and analysis by a counselor and/or counseling system 120. Additionally or alternatively, visitations system 130 may enable a multi-participant three-way call, chat, or video conference between the resident, the non-resident, and a counselor or therapist in real-time.

At block 506, method 500 includes enabling or facilitating one or more follow-up counseling sessions between at least one of the resident or the non-resident, and a counselor. For example, counseling system 120 may evaluate a recording of the communication, determine that one or more issues were raised during the communication either automatically or with help of a human operator, and may determine that additional counseling is required or recommended. Additionally or alternatively, counseling system 120 may automatically require or recommend the follow-up counseling session(s) as part of a curriculum or program which the resident and/or non-resident is participating.

FIG. 6 is a flowchart of an example of a method for performing family communications and counseling activities following a curriculum or program according to some embodiments. In some embodiments, operations of method 600 may be performed, at least in part, by communication system 101, counseling system 102, and/or visitation system 130 of FIG. 1. As shown, at block 601, method 600 includes scheduling an electronic communication between a resident and non-resident(s) of a controlled-environment facility, where the non-resident(s) is the resident's child(ren).

At block 602, method 600 includes scheduling a parent-child counseling session between the resident and a counselor or therapist. Additionally or alternatively, the parent-child counseling session may be performed electronically in an automated fashion (e.g., an audio or video lecture, etc.). Further, the parent-child counseling session is scheduled for a date and time prior to the electronic communication taking place. For example, in order to coordinate scheduling operations, visitation system 130 may communicate with counseling system 102, and/or AMS 116 to determine when the resident is available for the session, when the facility has one or more devices available for the counseling session, and, in some cases, when a human counselor or therapist is available for the counseling session. In some situations, the parent-child counseling session of block 602 may be scheduled prior to the scheduling of the parent-child communication in block 601.

At block 603, if the parent-child counseling session has not been successfully completed by the resident and/or non-resident, control passes to block 604. For example, in some cases, successfully completing the session may include simply attending the session. In other cases, the counselor or therapist may assign a pass/fail grade to the resident or non-resident. In yet other cases, to have successfully completed the session, either or both of the resident and the non-resident may have to obtain a minimum score on a test containing questions designed to determine their understanding of the material presented during the session. In the latter implementation, is one or both of the parties does not pass the test, then, at block 604, method 600 includes rescheduling (i.e., postponing) or canceling the otherwise upcoming parent-child communication.

Otherwise, if block 603 indicates successful completion of the counseling session, then at block 605 method 600 includes enabling or facilitating the electronic communication between the resident and non-resident. At block 606, method 600 includes determining whether the communication requires a follow-up counseling session. Again, such a determination may be made based upon a recording of the communication and/or a live evaluation of the communication by a counselor or therapist. If such follow-up counseling session is suggested or required, one or more sessions may be scheduled at block 607.

In some cases, if the follow-up counseling session is required (e.g., as opposed to merely suggested), a warning may be placed in the resident's electronic records prohibiting further communications between the resident and the non-resident until the resident or non-resident completes his or her counseling session(s) or program. At block 608, if the follow-up counseling session is deemed successful (similarly to block 603), then an incentive operation may be performed at block 609, otherwise a penalty operation may be performed at block 610.

For example, in order to encourage participation in a parent-child counseling program, the controlled-environment facility may charge a smaller rate or amount for a given communication (telephone call, video visitation, etc.) when that communication is a parent-child communication and when at least one of the resident or the non-resident successfully participates or completes a counseling program. Examples of other forms of incentive that may be provided to a resident at reduced costs (or free) in response to participation in the program may include, but are not limited to, electronic content (e.g., MP3 songs, movies, books, etc.) and commissary items (e.g., electronics, snacks, drinks, furniture, etc.). For instance, in some implementations, the controlled-environment facility (or its administration/representative) and/or the local, state, or Federal government may pay charges associated with these parent-child counseling programs, visitation sessions, counseling sessions, and/or follow up counseling sessions in order to effectively subsidize their cost.

In some cases, by participating in the counseling program, the controlled-environment facility may also award the resident other benefits, such as, for example, increased number or amount of visitation sessions, increased number or amount of electronic communications, increased amount of Internet access, increased leisure time, increased pay (e.g., for in-facility jobs), and credit for good behavior (e.g., for early release from the facility).

Additionally or alternatively, in order to encourage participation in a parent-child counseling program, the controlled-environment facility may apply a penalty to residents that do not complete the program. For example, the controlled-environment facility may block and/or charge a larger rate or amount for future communications between the resident and his or her child until the resident participates or completes the counseling program. Additionally or alternatively, the controlled-environment facility may limit the amount of electronic content (e.g., MP3 songs, movies, books, etc.), commissary items (e.g., electronics, snacks, drinks, furniture, etc.) that are available to the resident. In some cases, the controlled-environment facility may also reduce the resident's number or amount of visitation sessions, number or amount of electronic communications, leisure time, pay (e.g., for in-facility jobs), etc.

It should be understood that the various operations described herein, particularly in connection with FIGS. 5 and 6, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

What is claimed is:

1. A correctional facility counseling system, comprising:
    at least one processor; and
    a memory coupled to the at least one processor, the memory configured to store program instructions executable by the at least one processor to cause the counseling system to:
        receive an indication that a request for an electronic communication between a resident and a non-resident of a correctional facility has been made and that the non-resident is the resident's child or parent;
        initiate an automated counseling presentation, which includes a counseling curriculum or program for improving a relationship between the resident and the resident's child or parent, to the resident in response to the indication; and
        facilitate the electronic communication between the resident and the non-resident.

2. The counseling system of claim 1, the program instructions further executable by the at least one processor to cause the counseling system to facilitate the electronic communication between the resident and the non-resident in response to successful completion of the automated counseling presentation by the resident.

3. The counseling system of claim 1, the program instructions further executable by the at least one processor to cause the counseling system to provide the resident an incentive to review the automated counseling presentation.

4. The counseling system of claim 1, the program instructions further executable by the at least one processor to cause the counseling system to allow a family counseling provider to participate in the electronic communication in real-time.

5. The counseling system of claim 4, the program instructions further executable by the at least one processor to cause the counseling system to electronically analyze content of the electronic communication and allow the family counseling provider to participate in the electronic communication in real-time in response to the resulting electronic analysis of the content of the electronic communication.

6. The counseling system of claim 5, the program instructions further executable by the at least one processor to cause the counseling system to allow the family counseling provider to participate in the electronic communication in real-time in response to analysis of content of the electronic communication electronically identifying keywords occurring in during the electronic communication.

7. The counseling system of claim 5, the program instructions further executable by the at least one processor to cause the counseling system to allow the family counseling provider to participate in the electronic communication in real-time in response to analysis of content of the electronic communication electronically identifying how much conversation is being conducted by each party during the electronic communication.

8. The counseling system of claim 5, the program instructions further executable by the at least one processor to cause the counseling system to allow the family counseling provider to participate in the electronic communication in real-time in response to analysis of content of the electronic communication electronically identifying whether screaming and/or crying is present during the electronic communication.

9. The counseling system of claim 4, the program instructions further executable by the at least one processor to cause the counseling system to prevent the child from seeing or hearing the family counseling provider's participation.

10. A non-transitory computer-readable storage medium having program instructions stored thereon that, upon execution by a computer-based correctional facility video visitation system, cause the computer-based correctional facility video visitation system to:
    receive a request for a video visitation between a resident and a non-resident of a correctional facility;
    determine that the non-resident is the resident's child or parent;
    electronically analyze content of the video visitation;
    enable a family counseling provider to access the video visitation in response to analysis of content of the video visitation.

11. The non-transitory computer-readable storage medium of claim 10, wherein, upon execution by the computer-based video visitation system, further causes the computer-based video visitation system to:
    prior to the video visitation, initiate an automated counseling presentation, which includes a counseling curriculum or program for improving a relationship between the resident and the resident's child or parent, to the resident, in response to determination that the non-resident is the resident's child or parent; and
    facilitate the video visitation between the resident and the non-resident, in response to successful completion of the automated counseling presentation.

12. A correctional facility counseling method comprising:
    receiving, by a correctional facility counseling system, an indication that a request for an electronic communication between a resident and a non-resident of a correctional facility has been made and that the non-resident is the resident's child or parent;

initiating, by the correctional facility counseling system, an automated counseling presentation, which includes a counseling curriculum or program for improving a relationship between the resident and the resident's child or parent, to the resident in response to the indication; and facilitating, by the correctional facility counseling system, the electronic communication between the resident and the non-resident.

13. The method of claim 12, further comprising facilitating the electronic communication between the resident and the non-resident, by the correctional facility counseling system, in response to successful completion of the automated counseling presentation by the resident.

14. The method of claim 12, further comprising providing to the resident, by the correctional facility counseling system, an incentive to review the automated counseling presentation.

15. The method of claim 12, further comprising allowing, by the correctional facility counseling system, a family counseling provider to participate in the electronic communication in real-time.

16. The method of claim 15, further comprising electronically analyzing, by the correctional facility counseling system, content of the electronic communication and wherein allowing the family counseling provider to participate in the electronic communication in real-time is in response to the resulting electronic analysis of the content of the electronic communication.

17. The method of claim 16, wherein allowing the family counseling provider to participate in the electronic communication in real-time is in response to analysis of content of the electronic communication electronically identifying keywords occurring in during the electronic communication.

18. The method of claim 16, wherein allowing the family counseling provider to participate in the electronic communication in real-time is in response to analysis of content of the electronic communication electronically identifying how much conversation is being conducted by each party during the electronic communication.

19. The method of claim 16, wherein allowing the family counseling provider to participate in the electronic communication in real-time is in response to analysis of content of the electronic communication electronically identifying whether screaming and/or crying is present during the electronic communication.

20. The method of claim 15, further comprising preventing the child from seeing or hearing the family counseling provider's participation.

* * * * *